Feb. 23, 1926.

J. D. FRASER

MOTOR VEHICLE TRANSMISSION

Filed Sept. 25, 1922

1,574,383

INVENTOR
J. D. FRASER
By Fetherstonhaugh Co
Attys.

Patented Feb. 23, 1926.

1,574,383

UNITED STATES PATENT OFFICE.

JOHN DANIEL FRASER, OF LEAMINGTON, ONTARIO, CANADA.

MOTOR-VEHICLE TRANSMISSION.

Application filed September 25, 1922. Serial No. 590,438.

*To all whom it may concern:*

Be it known that I, JOHN DANIEL FRASER, a resident of the town of Leamington, in the county of Essex, in the Province of Ontario, Canada, have invented certain new and useful Improvements in Motor-Vehicle Transmissions, of which the following is the specification.

My invention relates to improvements in motor vehicle transmissions and the object of the invention is to devise a variable speed mechanism by means of which the gear ratio between the engine shaft and the driving wheels of the vehicle may be altered by merely decreasing or increasing the rotative speed of a member of the transmission.

A further object is to devise a transmission in which the gears will always be in mesh, thus reducing the wear thereon and also the noise of the gears coming in contact, and a still further object is to devise a transmission in which there will be an infinite number of gear ratios instead of any set number.

Figure 1:
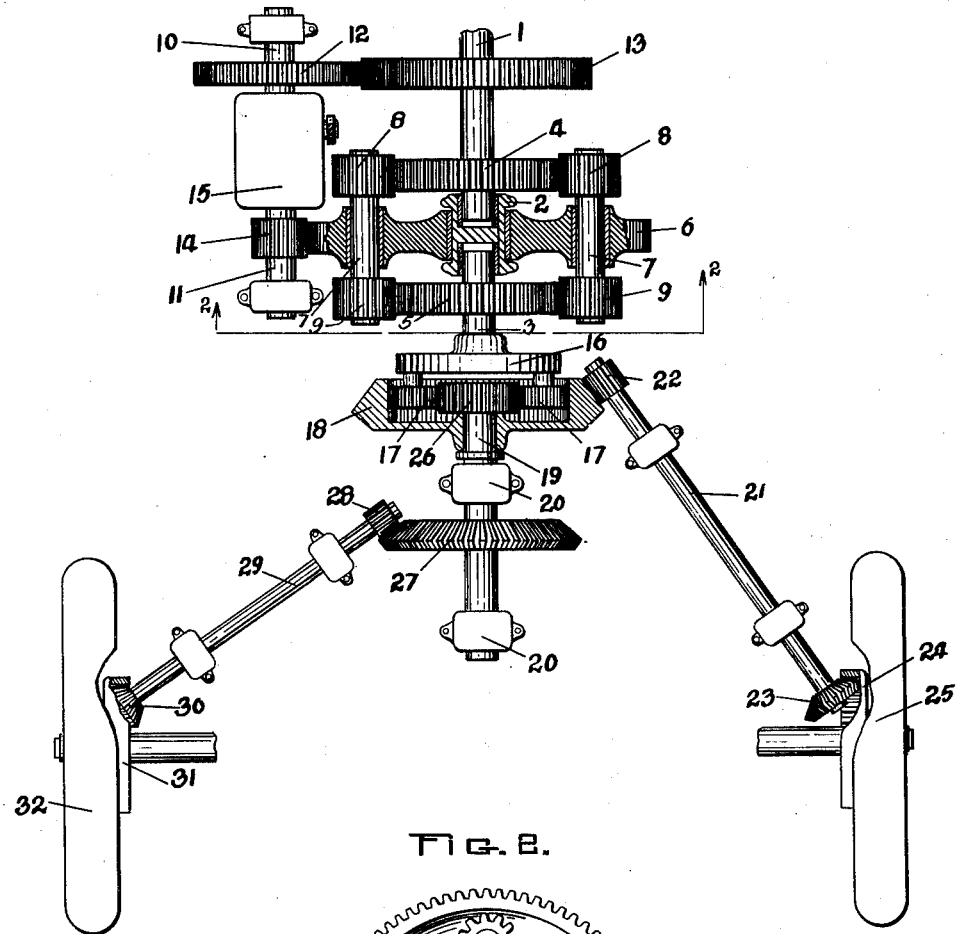
Figure 2:
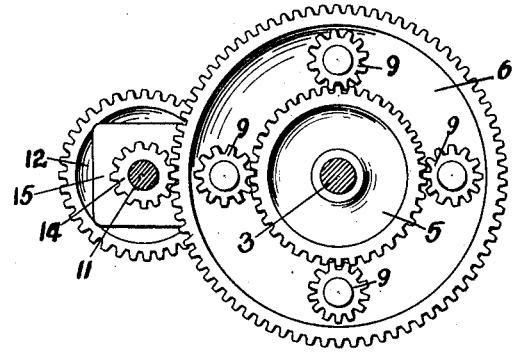

My invention consists of a transmission constructed and arranged all as hereinafter more particularly described and illustrated in the accompanying drawing in which:

Fig. 1 is a plan view partly in section of a transmission constructed according to my invention, and Fig. 2 is a vertical section through the line 2—2 Figure 1.

Like characters of reference indicate corresponding parts in the different views.

1 is the engine shaft upon the rear end of which is rotatably mounted the sleeve 2. 3 is the driven shaft, the forward end of which is freely inserted into the sleeve 2. 4 is a gear keyed to the engine shaft 1 in the vicinity of its rear end and 5 is a gear keyed to the driven shaft 3. 6 is a gear rotatably mounted on the sleeve 2 and carrying a plurality of longitudinal rotatable stub shafts 7, the axes of which are on the same radii. 8 are pinions secured to the forward ends of the shafts 7 and adapted to mesh with the gear 4, and 9 are pinions secured to the rear ends of the shafts 7 and adapted to mesh with the gear 5.

10 and 11 are two independent longitudinally extending counter shafts, the shaft 10 carrying the gear 12 adapted to mesh with a gear 13 secured to the engine shaft in front of the gear 4. 14 is a pinion secured to the counter shaft 11 and adapted to mesh with the gear 6. The adjacent ends of the shafts 10 and 11 are connected together by a friction clutch 15. The rear end of the driven shaft 3 is provided with a plate 16 upon which are rotatably mounted the differential pinions 17 which mesh respectively with the internal teeth of the crown gear 18 freely mounted on the rearwardly extending shaft 19 suitably mounted in bearings 20.

21 is a right hand propeller shaft provided with a pinion 22 at its forward end adapted to mesh with the external teeth of the crown gear 18, and provided at its rear end with the bevelled pinion 23 meshing with the internal teeth of the driving drum 24, secured to the right hand rear wheel 25. The forward end of the shaft 19 is provided with the gear 26 which also meshes with the pinions 17.

27 is a bevelled gear secured to the shaft 19 intermediately of the length of the same adapted to mesh with the pinion 28 on the forward end of the left hand propeller shaft 29 which is provided at its rear end with a bevelled pinion 30 meshing with the internal teeth of the driving drum 31 secured to the left hand wheel 32.

My device operates as follows:

The clutch 15 is so designed that the speed of the shaft 11 can be varied relatively to the shaft 10 and when it is desired to vary the speed of the driven shaft 3 relatively to the engine shaft 1 the speed of such driven shaft 11 is varied by means of the clutch and if the shaft 11 is decreased in speed the gear 6 which is connected thereto by means of the pinion 14 will be decreased in speed, thus causing an increase in speed in the stub shafts 7, with a consequent increase in speed of the pinions 9 which will increase the speed of the gear 5 and consequently the driven shaft 3. The crown gear 18 and the gears therein replace the ordinary differential gears and are merely so designed to be applicable to two independent propeller shafts.

On the other hand should the speed of the shaft 11 be increased through the medium of the clutch 15 it is obvious that the speed of the gear 6 will be increased and consequently the speed of the pinions 9 will be decreased with the consequent decrease in the speed of the driven shaft 3, relatively to the engine shaft 1.

Direct drive can be secured by locking the shaft 11 against rotation which will in turn lock the gear 6 against rotation, and thus the stub shafts 7 will now act as counter shafts and as the pinions 8 and 9 are of the same diameter and the gears 4 and 5 of the same diameter, it is obvious that the driven shaft will be rotated at the same speed as the engine shaft.

In order to throw the gear into neutral it is only necessary to release the shaft 11 which will permit the free rotation of the gear 6 and when this occurs there will be no positive driving connection between the gear 4 and the gear 5.

The differential action of the driving wheel drive is as follows:

The crown gear 18 is driven by the pinions 17 which rotate about the centre of the shaft 3 as well as on their respective stub shafts. As the right hand driving wheel is retarded when turning to the right, the speed of the crown wheel 18 decreases and consequently the speed of the pinions 17 about their own axes is increased with the consequent increase in rotation of the gear 26, which through the medium of the gear 27 and propeller shaft 29 correspondingly increases the speed of the left hand driving wheel 32.

On the other hand should the left hand driving wheel be retarded by turning to the left, the speed of the crown gear 18 is increased and as the crown gear 18 is connected to the right hand driving wheel the speed of such right hand driving wheel be correspondingly increased.

From the above description it will be seen that I have devised a simple and effective transmission in which the ratio of the driven shaft to the engine shaft can be varied infinitely instead of being limited to a predetermined number of gear ratios. In addition I have devised a transmission in which all the gears are continually in mesh.

What I claim as my invention is:

1. In a variable speed transmission for motor vehicles, the combination with the engine and driven shafts, of gears secured thereto in the vicinity of their adjacent ends, an idler gear mounted between the gears and free of the respective shafts, a plurality of longitudinally extending stub shafts rotatably mounted on the idler gear, pinions on the forward and rear ends of each stub shaft meshing respectively with the gears on the engine and driven shafts, a plurality of counter shafts, a friction clutch between the adjacent ends of the counter shafts, a pinion on the rear counter shaft meshing with the idler gear, a second gear on the engine shaft, and a gear on the forward counter shaft meshing therewith.

2. In a variable speed transmission for motor vehicles, the combination with the engine and driven shafts, of gears secured thereto in the vicinity of their adjacent ends, an idler gear mounted between the gears and free of the respective shafts, a driving connection on the idler gear engaging the respective gears, a plurality of counter shafts, a friction clutch between the adjacent ends of the counter shafts, a pinion on the rear counter shaft meshing with the idler gear, a second gear on the engine shaft, and a gear on the forward counter shaft meshing therewith.

JOHN DANIEL FRASER.